INVENTORS
ANTHONY J. FISCHER
NELS B. LUND
BY
ATTORNEY.

Jan. 29, 1935. A. J. FISCHER ET AL 1,989,589
SEWAGE DIGESTION
Filed May 31, 1934 8 Sheets-Sheet 2
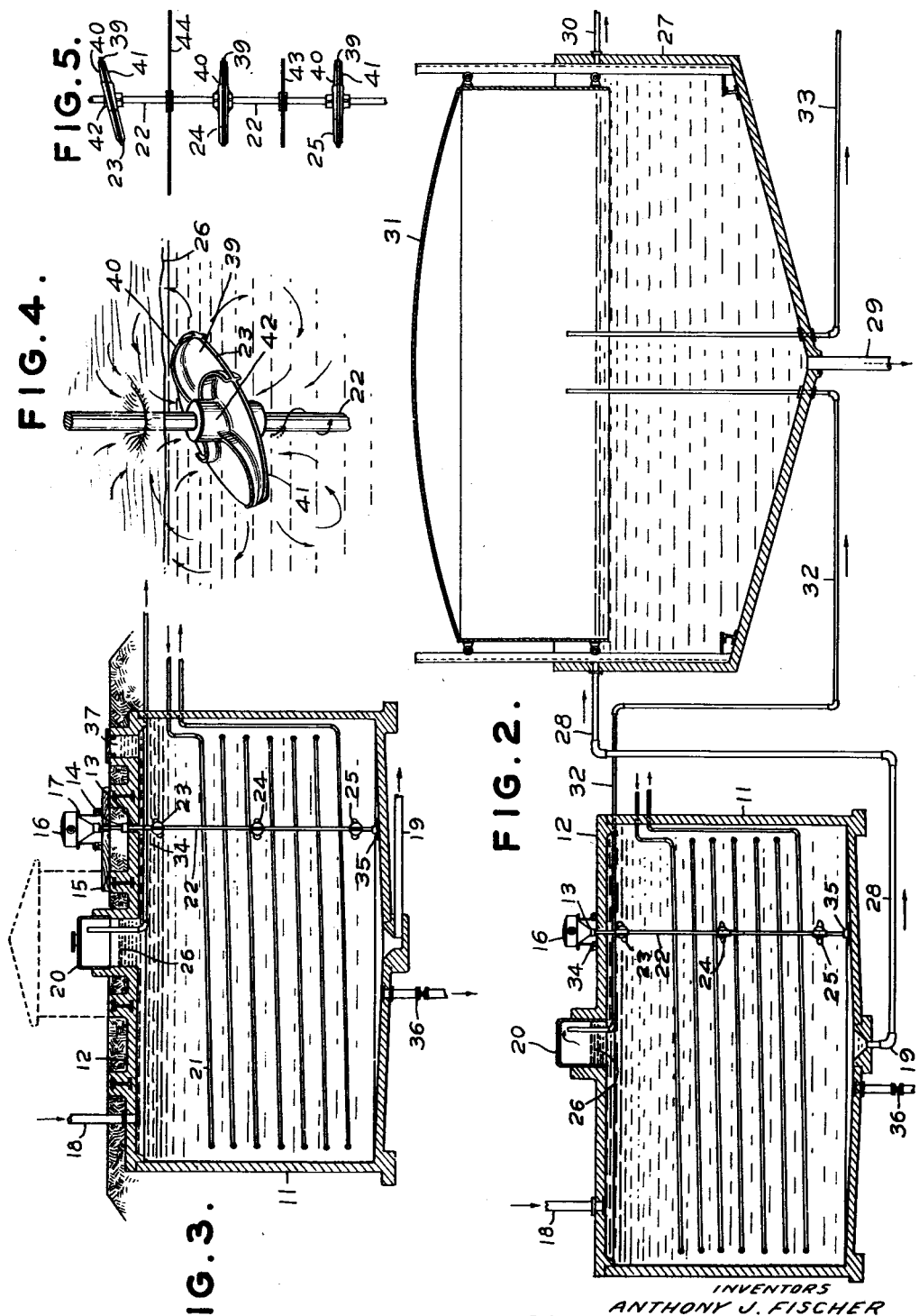
INVENTORS
ANTHONY J. FISCHER
NELS B. LUND
BY
ATTORNEY

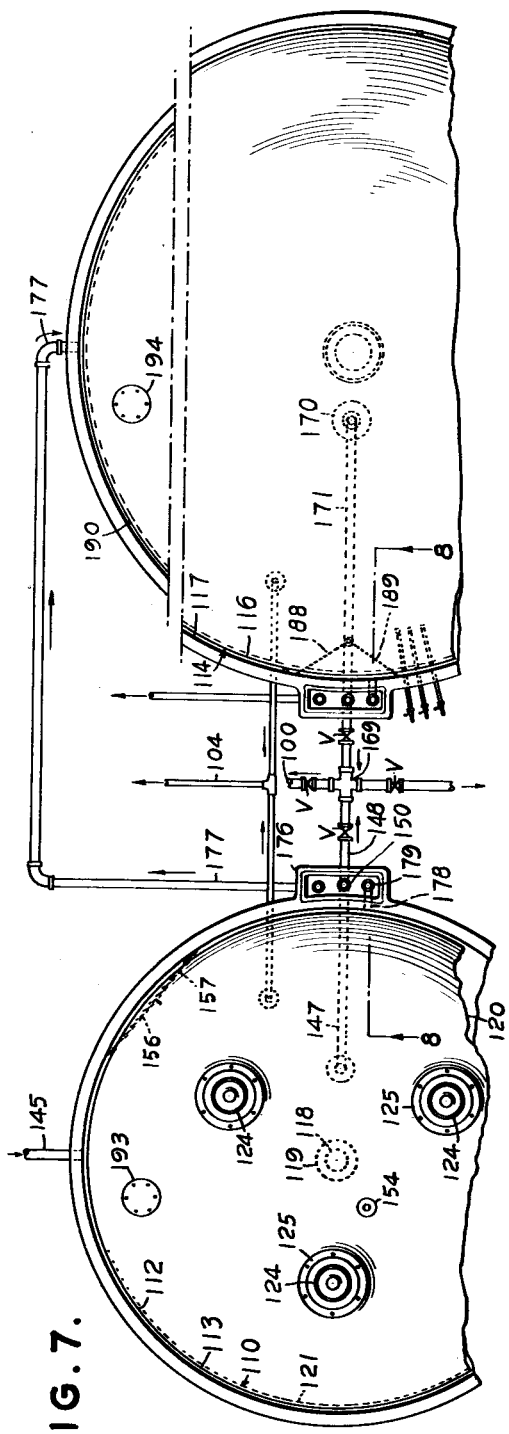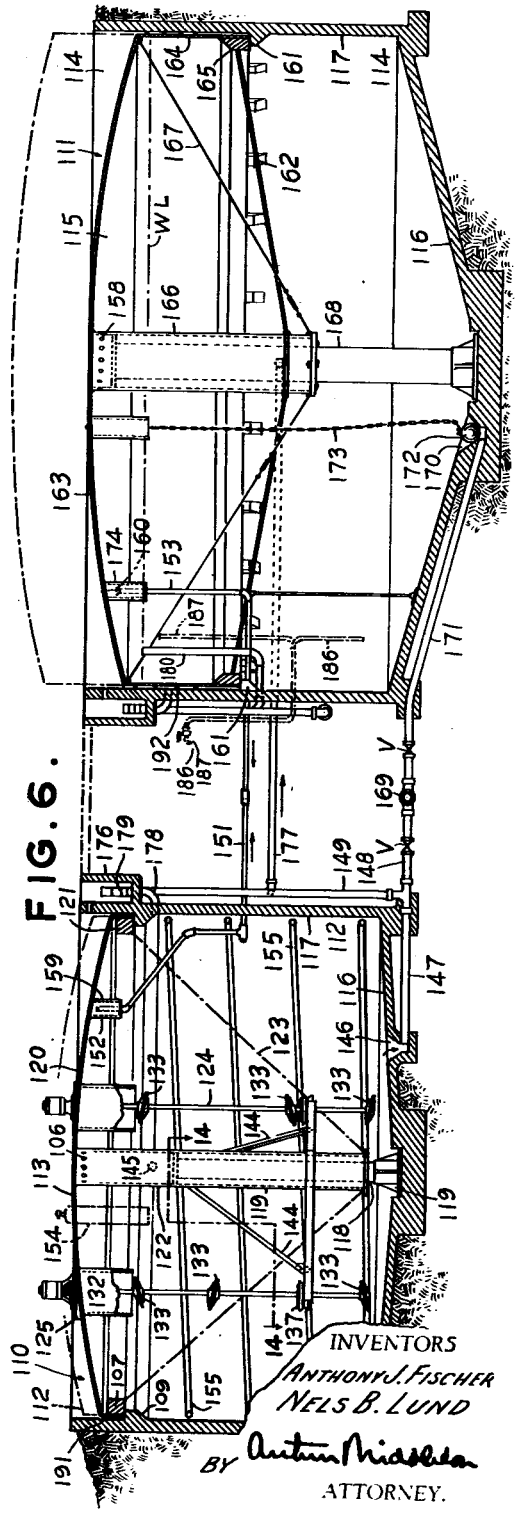

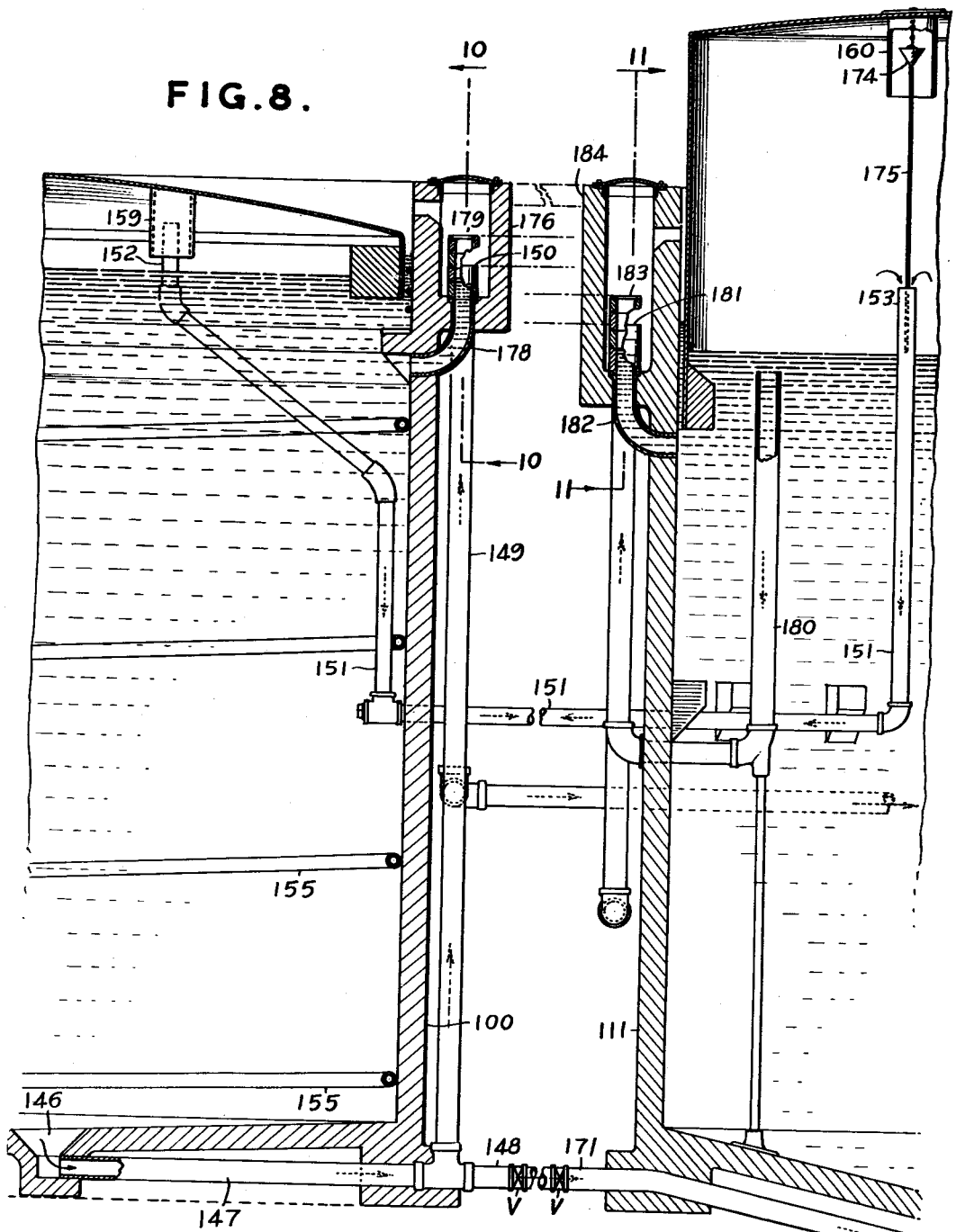

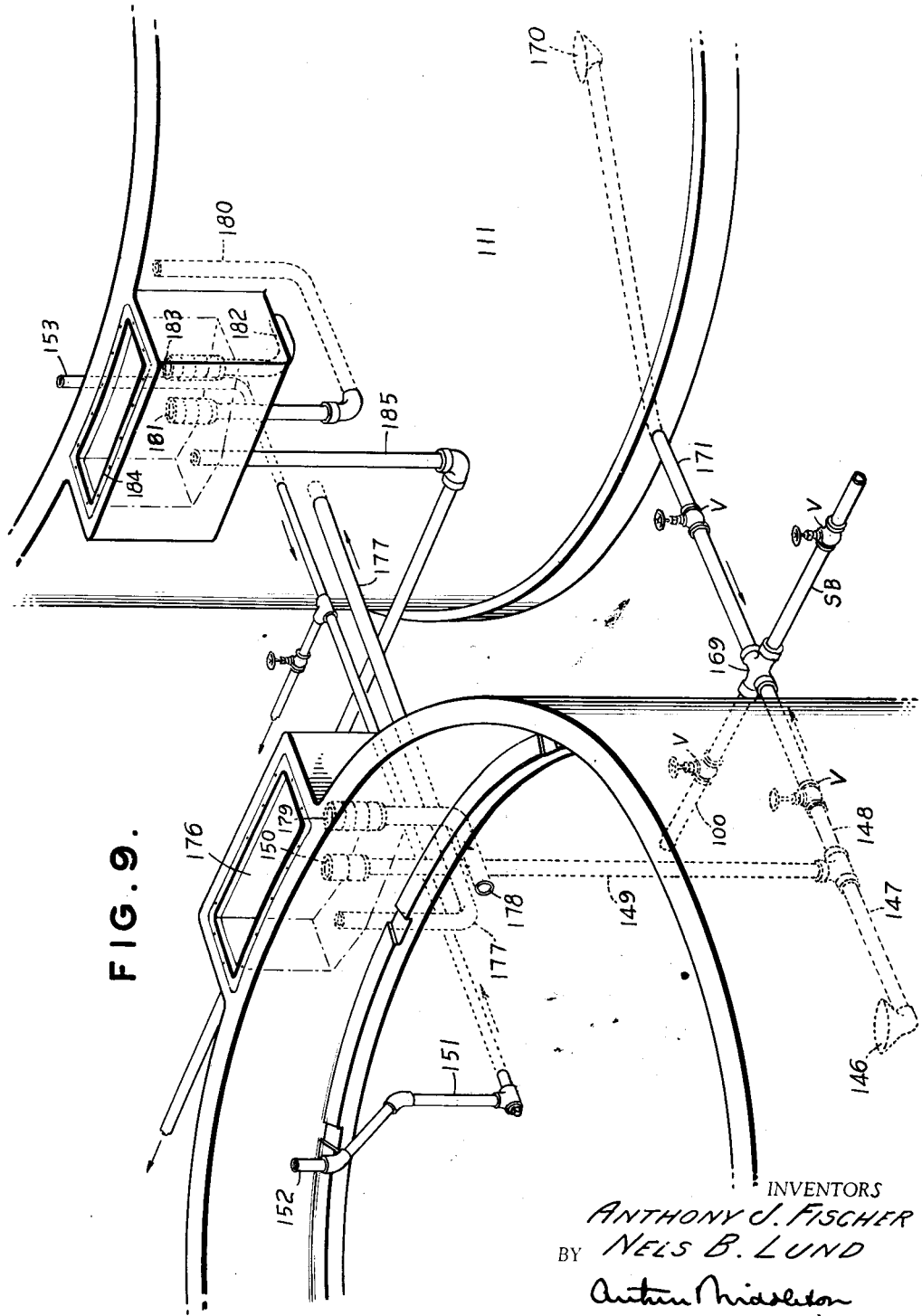

Jan. 29, 1935.  A. J. FISCHER ET AL  1,989,589
SEWAGE DIGESTION
Filed May 31, 1934  8 Sheets-Sheet 6

INVENTORS
ANTHONY J. FISCHER
BY NELS B. LUND

Arthur Middleton
ATTORNEY.

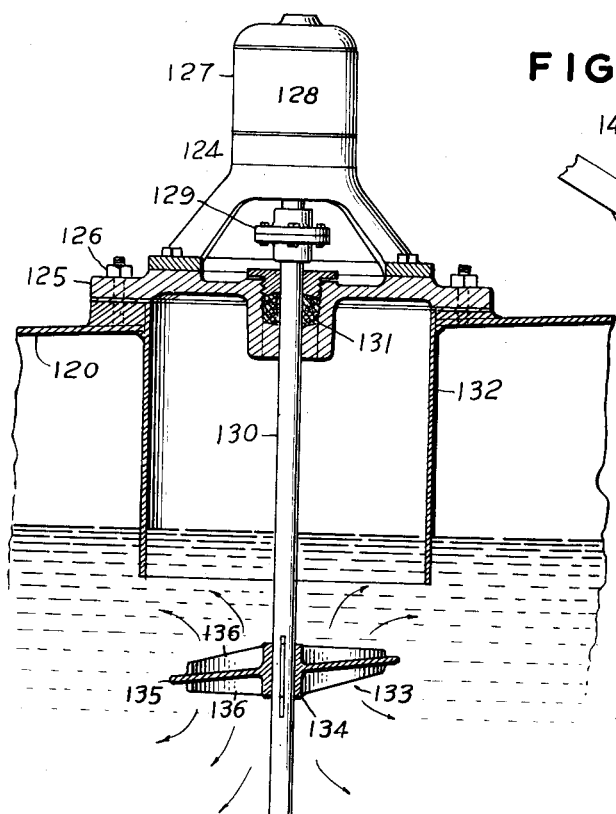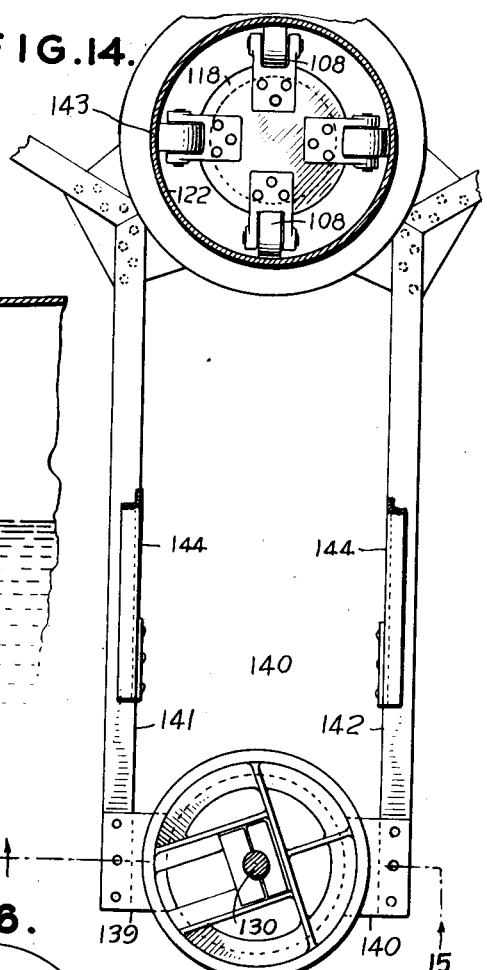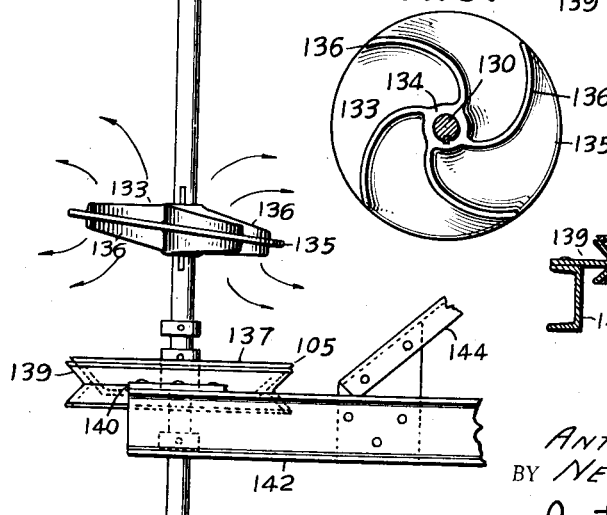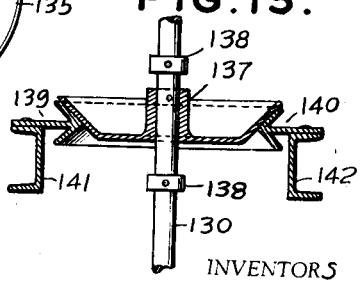

Jan. 29, 1935.  A. J. FISCHER ET AL  1,989,589
SEWAGE DIGESTION
Filed May 31, 1934  8 Sheets-Sheet 8
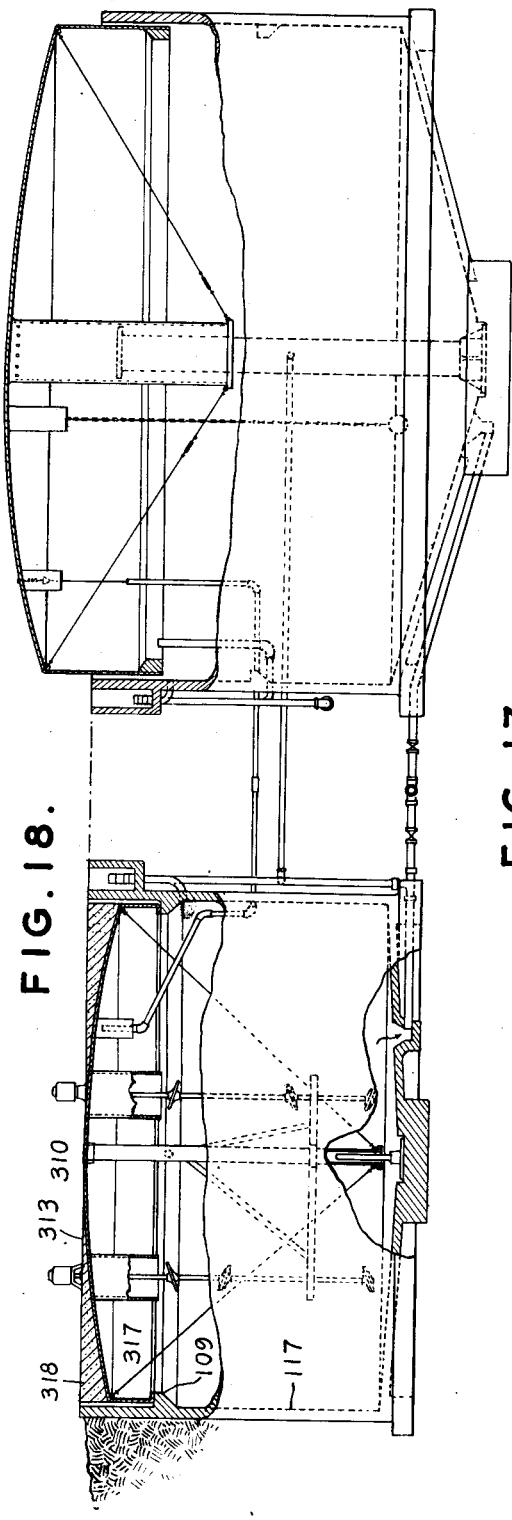
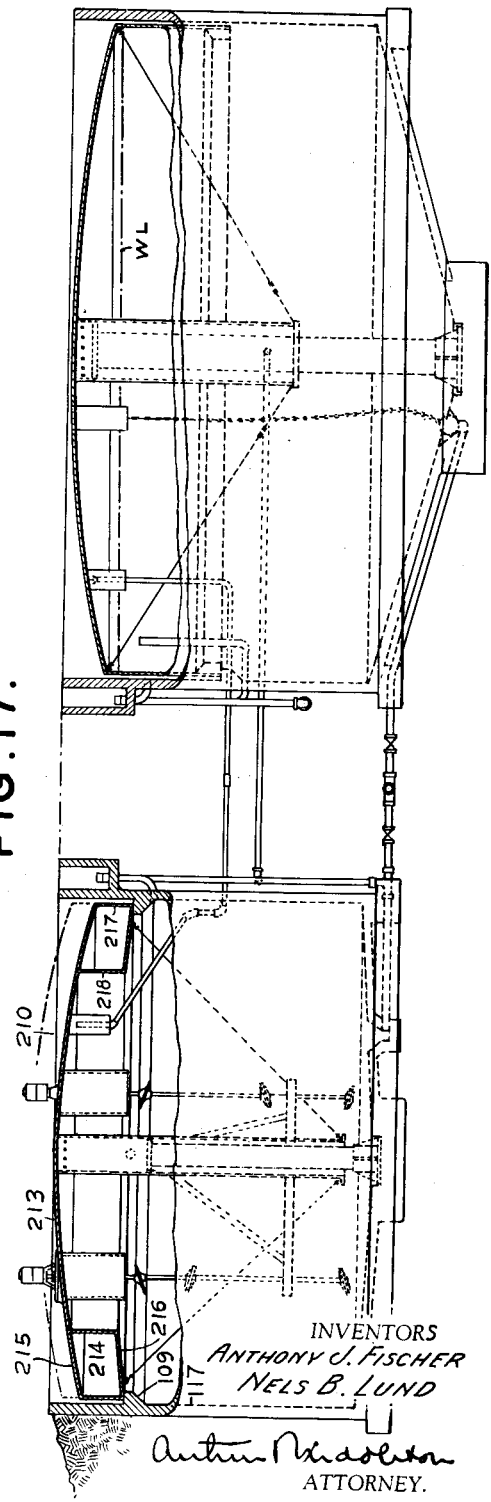
INVENTORS
ANTHONY J. FISCHER
NELS B. LUND
ATTORNEY.

Patented Jan. 29, 1935

1,989,589

UNITED STATES PATENT OFFICE 1,989,589

SEWAGE DIGESTION

Anthony J. Fischer, Jackson Heights, and Nels B. Lund, Seaford, N. Y., assignors to The Dorr Company, Inc., New York, N. Y., a corporation of Delaware Application May 31, 1934, Serial No. 728,376

10 Claims. (Cl. 210—2)

In the treatment of sewage and analogous polluted waters according to modern practice it is quite common to effect an early separating as by settling and withdrawal of the suspended solids of the sewage in the form of a sludge and to subject the withdrawn sewage sludge to what is known as sewage sludge digestion. Sometimes in this class of work the sewage sludge is obtained in a condition which is known as raw or untreated sludge. According to other procedures either the sewage is chemically treated or the sludge may be treated whereby there may be obtained what may be termed a chemically treated sludge. The chemical treatment may have been provided to facilitate the precipitation for the ultimate obtaining of the solids as sewage sludge. Also according to certain procedures the sewage or the sewage sludge is subjected to aeration which is employed as for example to facilitate the precipitation of the sludge solids called activated sludge or in order to obtain a sewage sludge having certain characteristics which facilitate the process as a whole.

Raw or untreated sludge often has acid characteristics. Where the sewage is aerated the sewage sludge obtained may have an acid characteristic particularly where the sludge is stored prior to digestion.

When sewage sludge is digested the acid characteristic has to be overcome and the sludge takes on an alkaline characteristic which is desirable throughout the entire digesting period. This alkaline characteristic may be the result of anaerobic bacterial action which results in digestion which is duly initiated and which is maintained. This digestion is the conversion by virtue of bacterial activity of certain of the sewage solids into some other physical form such as a liquid or a gas. Some sewage solids are digestible while others are not. Digestible sewage solids are largely putrescible, so their conversion by digestion thus eliminates their odoriferous nuisance from digested sewage sludge.

The present invention is particularly concerned with apparatus, method and/or system for or relating to or useful in connection with the digesting of sewage sludges or mixtures thereof no matter how obtained and particularly according to methods in which there is digestion of the sewage sludge as the result of biological or bacteriological action during which certain bothersome sewage solids undergo decomposition and disintegration.

The foregoing remarks have been set forth whereby the general position of the present invention is readily oriented in respect to the art of which it constitutes an operative and important part.

The present invention according to one aspect thereof relates to the biological digestion of sewage sludge and its analogues, and one of the objects thereof is to so treat the sludge that its digestion will be hastened and so that small digesters of less volume may be used with a consequent lessening of installation costs while another object is to hasten the production of methane gas due to bacterial action so that the same proportionate amount of usable combustible gas is derived from the sludge even though the digestion period is shortened.

Further aspects relate to the simplifying of the construction of the digester; to the reducing of the cost of its operation; to the devising of means for preventing troublesome scum formation therein; to the combining of the second stage digester with a gas holder or gasometer, and generally to the obtaining of an overflow of liquor of better quality and of lower solids content than has been obtainable heretofore. Still further aspects relate to the eliminating or avoiding of pumping of the sludge between digesting stages by automatically displacing digesting sludge from the first stage to the second stage by raw sludge being introduced into the first stage; and to the utilizing of the full capacity of the first tank as effective sludge digestion volume inasmuch as no separate liquor storage space or zone need be kept in or about this tank, as is usual in plants as now operated.

The present invention according to certain phases thereof revolves about the discovery that digester liquor can be depended upon for seeding or inoculating fresh sewage sludge with anaerobic bacteria to initiate and to stimulate the bacteriological digestion thereof to a greater degree than can digesting sludge solids, when considered on a dry solids-content basis. Formerly, it was believed that the ratio of digested sludge solids to the raw sludge solids was the determining factor in calculating the volume of seeding material required. With the aforementioned discovery in mind the process and apparatus of this invention is based upon the aim of confining the movement of the heavier sludge solids to a limited horizontal zone while the movement of the liquor is unrestricted and is circulated throughout the entire mass in the digester; that is, the invention contemplates primarily the selective and differential circulation of digester liquor and digester solids.

According to another phase of this invention, recognition is given to the fact that the processes of digestion and sedimentation are antagonistic since sedimentation requires quiescence while digestion requires turbulence. Therefore, by this invention, it is proposed to carry out digestion under such conditions that it is not hindered by sedimentation. To that end, digestion is carried out in one container or compartment while sedimentation is carried out in another. Thus digestion can be carried out with concurrent conditions of turbulence to insure homogeneity of the entire sludge mass within the digesting compartment, while in the other container or compartment any digestion that may take place will not essentially interfere with ultimate sedimentation. Thus, one mode of carrying out the invention may be said to be the rapid stirring or agitating of the sludges while in various degrees of bacteriological digestion in a primary digester in substantially horizontal zones with an additional superposed zone of non-horizontal stirring, more specifically of circumnutatory stirring, in a top or upper zone therein. The primary digester has an inlet or feed and a digesting sludge discharge, but it does not need the usual effluent outlet since sedimentation is normally prevented. Digesting sludge discharged from the digester is conveyed to a sedimentation device or clarifier where sedimentation takes place, and digestion is tapered off or allowed to taper off. Settled digested sludge is discharged from the clarifier along one path, substantially clear effluent is decanted therefrom along another path, and gas generated by the secondary digestion in rising may be caught in a gas collector preferably associated with or constituting a part of the clarifier or secondary digester.

The combination of zones of horizontal stirring surmounted by a zone of non-horizontal and razzle-dazzle stirring—viz., surmounted by a zone of circumnutatory stirring—is an important feature of this invention and so is the feature of a tilted or non-horizontal impeller for setting up the razzle-dazzle action or circumnutatory motion for the purpose of beating back into the digesting mass any foam- or scum-forming solids and any liquor that would otherwise tend to accumulate at the top of the mass. The razzle-dazzle action or circumnutatory motion may be defined as rotatory flow or current movements, the planes of which oscillate vertically. Another feature is the use of impellers or stirrers of the turbo-mixer type which set up fluid currents that are cyclic and to some extent epicyclic.

The present invention according to one important aspect thereof relates to the digestion of sewage sludge in a system employing multiple digesters or digestion stages, to wit, in a system wherein the larger or major part of the digestion of the sludge is carried out in a relatively small tank having an associated gas collecting or holding member constituting an essential element of a primary digester, and wherein the lesser part of the digestion is decreasingly carried out and tapers off in a relatively large tank having an associated gas collecting or holding member constituting an essential element of a secondary digester into which the sludge which has been almost digested in the primary digester is transferred for the completion of the digestion and for a sedimentation or settling of the remaining sludge solids, and into which gas produced in the primary digester is conducted for storage in the larger gas holder of the secondary digester.

As previously indicated the digestion which is carried out in the digesters being essentially due to anaerobic bacterial activity is accompanied with the giving off or production of an appreciable amount of combustible gas suitable for illuminating, heating and/or power purposes and certain aspects of the present invention revolve about constructional and operative features incidental to the handling and controlling of the gas thus produced.

The present invention according to one phase thereof is specifically directed to a sewage treatment or process according to which raw, activated, chemically precipitated or mixed sludge derived from any suitable preliminary thickening operation—such for example as is obtained from the sedimentation of raw sewage—is passed from time to time to a primary digester wherein digestion—due to the development and maintenance of active anaerobic bacteria—is carried out in the absence of air. This digestion is accompanied by the giving off or production of combustible gas consisting largely of methane—$CH_4$—that is conducted to a gas holder provided at the upper part of a secondary digester. The secondary digester is connected and arranged with respect to the primary digester so that as and when incoming sewage sludge is introduced into the primary digester a corresponding amount of digester treated and mixed sludge, in fact sludge which is almost completely digested, passes from the primary digester to the secondary digester whereby the amount of sludge undergoing digestion is maintained constant in the primary digester. The proportioning of the relative percentage of digestion to be carried out in the primary and secondary digesters is largely a matter of operative procedure but it is quite feasible for example to carry out a major part such as approximately 90% of the digestion in the primary digester and to allow the remaining minor part or 10% of the digestion to be completed in the secondary digester. The anaerobic digestion operation is one which is accompanied by rising gas bubbles. These bubbles oppose a tendency for solids to settle and therefore it is advisable to carry out as far as possible the digestion in the primary digester and to leave only a small portion of the digestion to be carried out in the secondary digester where sedimentation of the remaining solids is essentially sought to be obtained.

According to one arrangement of apparatus for realizing the basic aspects of the invention there is employed a primary digester having a fixed or unyielding top—such as is realized by a built-in-place top—and the sludge undergoing digestion should be considered as approaching close to or even engaging the under side of the fixed top. However in such fixed top construction a receiving space is provided at the under side of a section of the top for gases developed and given off as a result of the digestion process carried out in the primary digester. Certain objectionable features either incident to the mechanical construction or to the operation of the apparatus exist in connection with said fixed top construction which have indicated the advisability of a vertically yieldable top which may lift or may float under certain conditions. The constructing of such vertically yieldable top involves the solving of several problems before it could be practically employed in order to meet the several operative conditions to which such a top might be subjected at some time or other during this period of use.

Therefore according to another and in certain respects preferred arrangement (or arrangements) of apparatus for realizing the basic aspects of the invention there is employed a primary digester (or primary digesters) having a vertically yieldable or vertically movable top or gas holder construction. In any event in realizing certain aspects of the invention there is employed with the gas holder or top member or cover of the primary digester—be the top member of the fixed, or yieldable, or vertically movable type—agitating mechanism known as turbo mixers, to wit, mixing elements which are carried by and supported from the top member or cover of the primary digester.

In the arrangements shown herein mixing devices are carried by the top of the primary digester—namely, by the fixed top or the yieldable top as the case may be—and these mixing devices are relied upon for effecting a more or less constant mixing of incoming sludge with the sludge undergoing digestion and certain aspects of the present invention revolve about this construction of the gas holder and particularly about the construction of the yieldable top of the primary digester so that it will have the required movement. When the alkaline condition essential for carrying out of the sewage digestion by anaerobic bacteria has been once established that condition will not be upset by incoming fresh sludge, even though the incoming fresh sludge may have an acid characteristic, because the immediate intimate mixing of the incoming sludge through the alkaline body of digesting sludge ensures the preponderance and prevalence of the alkaline characteristic and anaerobic bacterial activity.

The invention according to another aspect thereof revolves about a sewage sludge digester that comprises a sewage sludge receiving tank and an associated gas holder provided by a vertically yieldable top construction therefor which is operatively arranged with respect to the sedimentation tank.

According to another aspect of the present invention there is contemplated the employment with the secondary digester of a vertically movable gas holder which has a relatively long or extended vertical movement as compared with the normal limited movement of the gas holder for the primary digester. In short the construction as between the two gas holders is such that this long range movement of the secondary gas holder will take place for the effective storing of the gas according to the storage requirements and this while the gas holder for the primary digester has at the most only a vertically limited movement. This therefore involves the providing of piping of conduits whereby the gas receiving space of the primary digester—the digester wherein most of the gas is produced—is in communication with the gas receiving space of the gas holder of the secondary digester so that a relatively balanced or uniform gas pressure condition as between the holders will be ensured, particularly incident to the production of gas within the primary digester.

While according to certain preferred forms of the invention the arrangement is such that the secondary gas holder has a long range of movement as compared with any contemplated movement of the primary gas holder still it will be pointed out that the invention according to the broad aspects thereof is not necessarily so limited particularly since it is commercially feasible to construct and employ a primary digester with a gas holder that has relatively long movement and relatively large capacity.

Gas holders of the type involved depend for their normal functioning and for the preventing of the escape of gas from the interior thereof each upon a depending peripheral wall that dips into a sealing liquid, more particularly into the sewage sludge within the tank of the particular digester to which the holder corresponds and a more specific aspect of the present invention revolves about the employment of ballasting material provided at the lower edge of the peripheral wall of each gas holder whereby the gas holder having the long range of movement will function as desired as a gas storage means even though the gas holder for the primary digester has only a relatively limited range of vertical movement and which limited range of movement is caused by a ballasting load applied thereto more particularly to the peripheral wall thereof and which ballast functions after the holder rises in a manner tending to project the ballast above the level of the liquid within which the ballast is located.

The invention possesses other objects and features of advantage some of which with the foregoing will be set forth in the following description.

In the following description and in the claims parts will be identified by specific names for convenience but they are intended to be as generic in their application to similar parts as the art will permit. In the accompanying drawings which constitute a part of this specification there have been illustrated the best and most characteristic embodiments of the invention known to the undersigned but such embodiments are to be regarded as typical only of many possible embodiments and the invention is not to be limited thereto.

In said drawings Fig. 1 is a diagrammatic view illustrative of a sewage system embodying two sedimentation tanks either or both of which can be relied upon to receive a stream of sewage and from either or both of which at will sewage sludge derived as a result of a settling operation carried out therein can be passed to a primary digester as operative conditions permit and wherein the major portion of a sewage sludge digesting operation is carried out and from which primary digester sewage sludge that has undergone the digestion operation carried out therein is passed to the secondary digester in an amount corresponding to incoming sewage sludge as and when the latter is passed to and into the primary digester. This figure embodies the arrangement of the yieldable top primary digester and of the vertically movable top secondary digester as connected up and disclosed in relation to the primary and secondary digesters of Figs. 6 to 18 inclusive. This Fig. 1 is however illustrative of the position of the primary and secondary digesters of Figs. 2 to 5 inclusive particularly in respect to the clarifiers. The specific connecting up of the primary and secondary digesters of Figs. 2 to 5 inclusive is somewhat different from that of the connecting up of the primary and secondary digesters of Figs. 6 to 18 inclusive.

Fig. 2 is a diagrammatic view of a multiple digester arrangement embodying certain basic features underlying the present invention. In this figure a primary digester tank is shown as having a stationary top structure with gas receiving portion provided thereby and this top structure or top member carries one or more rotary mixing devices or sludge impelling devices particularly designed for effecting a razzle-dazzle or circumnutatory movement at the uppermost portion of the body of sewage sludge maintained within the primary digester while permitting a lower series of relatively horizontal current movements within the lower portions of the body of sewage sludge. In this view a secondary digester is associated with a primary digester. The secondary digester has a digester tank, which functions as a sedimentation tank, and a vertically movable gas holder providing an expansible and contractible gas receiving and storing space. The gas receiving spaces of the two digesters are in communication with each other through the medium of a suitable gas pipe. This figure also shows a conduit leading from the bottom of the primary digester tank to the secondary digester tank, also an effluent conduit or overflow leading from the secondary digester tank whereby according to the particular arrangement shows the high portion of the effluent conduit for the secondary digester tank and which is at the same elevation as the high portion of the conduit, determines the normal minimum level maintained within the primary digester tank.

Fig. 3 shows in somewhat more detail the primary digester of Fig. 2.

Fig. 4 indicates the razzle-dazzle or circumnutatory currents set up by a tilted impeller element designed for that purpose.

Fig. 5 shows a form of sludge impelling or agitating devices according to which there are shown in association a tilted impeller element at the top or upper portion of an impeller shaft and horizontal impeller elements carried by the lower portion of the same shaft.

Fig. 6 is a vertical sectional view showing in operative arrangement the primary and secondary digesters such as are employed in the arrangement of Fig. 1.

Fig. 7 is a plan view of the primary and secondary digester arrangement of Fig. 6.

Fig. 8 is a vertical sectional view partially broken away showing the relative arrangement and position of certain parts of the primary digester in respect to certain other parts of the secondary digester and more particularly the relative position of certain overflow constructions provided for the primary digester in respect to certain overflow constructions provided for the secondary digester.

Figure 9 is a perspective view illustrative of the overflow arrangements of Fig. 8. In Figs. 6 to 9 inclusive the overflow arrangements for the secondary digester are shown functioning in a horizontal path 180 degrees from the position which the same parts occupy in Fig. 1.

Figure 12:
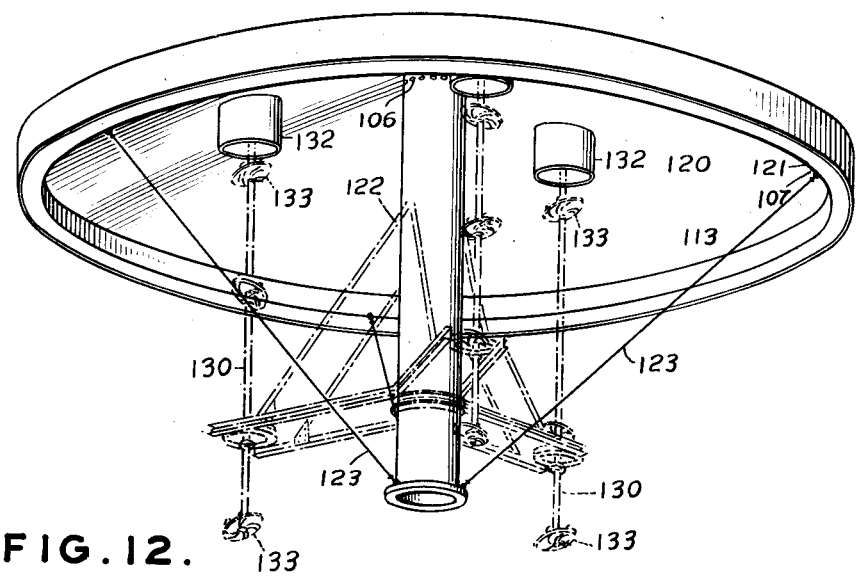
Fig. 12 is a perspective view of the vertically movable top member or gas holder used in the primary digester but it will be understood that the main features of this gas holder as embodied therein may also be embodied in the gas holder employed in the secondary digester.

There is not included in Fig. 12 the mixing devices carried by the gas holder.

Fig. 13 is a view partially in section showing the mixing device and the manner in which it is applied to the gas holder of Fig. 6.

Fig. 14 is a partial sectional view taken as on the plane indicated by the broken lines 14—14 of Fig. 6 looking in the direction of the arrows.

Fig. 15 is a vertical sectional view taken as on the plane indicated by the line 15—15 of Fig. 14 looking in the direction of the arrows.

Fig. 16 is a plan view of an impeller element used in the mixing device of Fig. 13.

Figure 1:
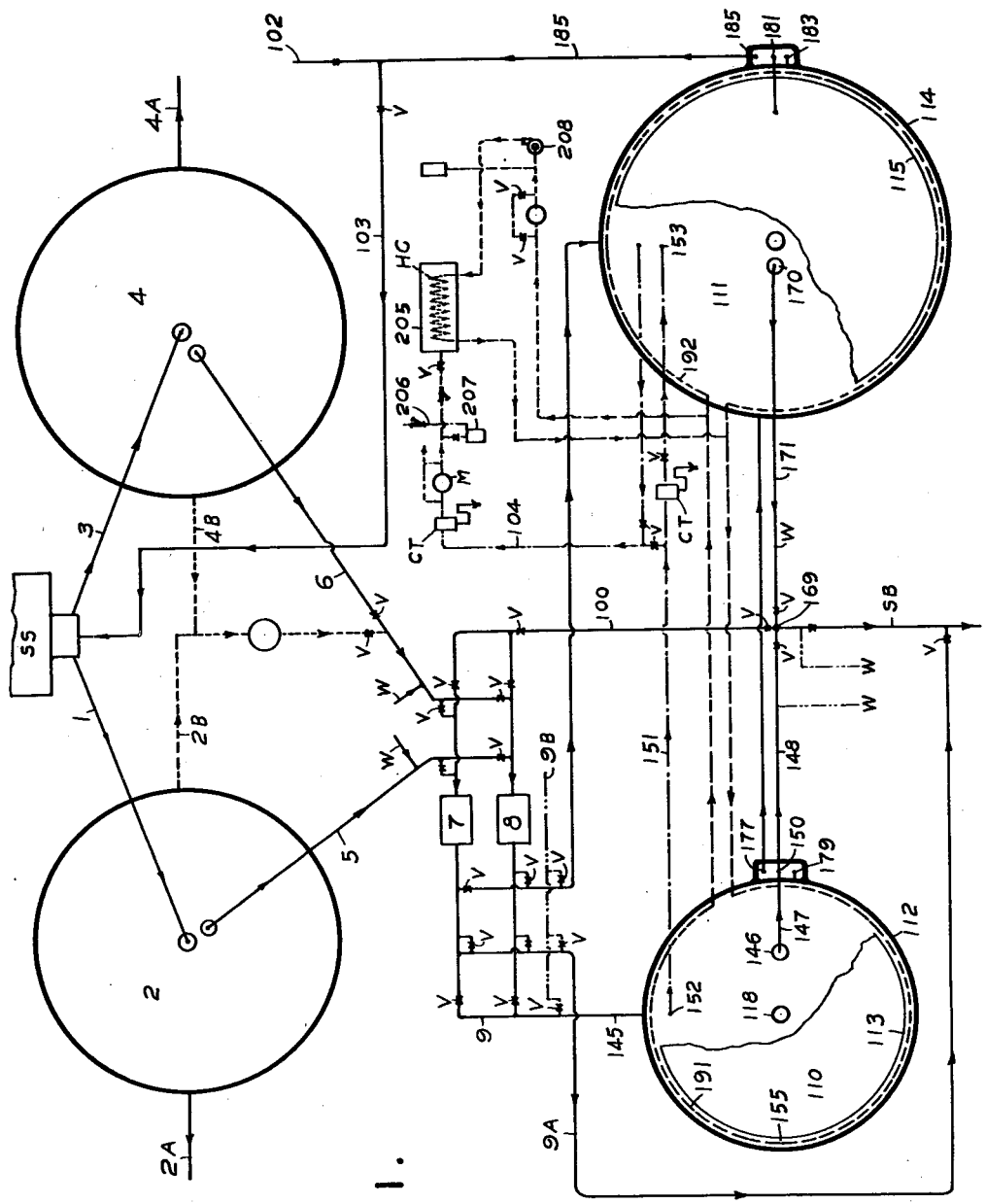

Figs. 8 to 16 inclusive are shown at a much larger scale than the same parts are shown in Figs. 6 and 7 and it will also be noted that Fig. 1 is at a smaller scale than any of the other figures.

Fig. 17 shows a primary and secondary digester construction that functions practically the same as the digesters shown in Fig. 6 except that in Fig. 17 the gas holder of the primary digester is shown as a floating cover arrangement that is provided with a pontoon construction that defines the peripheral wall thereof. In Fig. 6 each of the gas holders is shown as resting on stops— to wit, a position below that which they occupy in normal operation.

Fig. 18 shows a construction wherein primary and secondary digesters are employed that function much the same as the digesters in the arrangement of Figs. 6 and 17 but in the primary digester of Fig. 18 the normal position for the yieldable top is that which it occupies when resting upon the stops. In other words the yieldable top of the primary digester of this figure leaves the stops only due to a decidedly abnormal condition existing within the digester and in which instance it is free to yield or move upwardly.

Reference will now be made to the drawings in detail.

Like reference characters indicate parts functioning the same or substantially alike wherever they appear.

In the arrangement indicated in Fig. 1 the incoming sewage supply is designated by SS. The sewage from this supply is passed at will as along the path 1 to the clarifier, sedimentation tank, or sedimentation basin 2 or as along the path 3 to the clarifier 4. Settled sludge is withdrawn at will from one or both clarifiers as along the path 5 or the path 6 as the case may be and is delivered intermittently by means of sludge pumps 7 and/or 8 ultimately along the path 9 that terminates in feed pipe 145 to and into the primary digester 110 constituting part of a multiple digestion system that also comprises the secondary digester tank 111 arranged to receive intermittently from the primary digester sludge which is undergoing digestion and in an amount which is equal to the amount as and when fed into the primary digester for treatment. This tank 111 and its equivalents, while herein are referred to as secondary digesters, are primarily for carrying out sedimentation and secondarily for carrying out digestion.

Each of these digesters comprises a digester tank and an associated gas holder or gas collector. The tank of the primary digester is designated by 112 and its associated gas holder or collector by 113. The tank for the secondary digester is designated by 114 while its associated gas holder or collector is designated by 115.

As previously indicated piping or other passage is provided whereby partially digested sludge can pass from the primary digester to the secondary digester as is required incident to the supplying of the incoming sludge to the primary digester. Piping is also provided whereby the gas receiving spaces within the two digesters are in communication with each other during all normal periods of operation. These piping arrangements will later be described more in detail.

Also as previously indicated the digester arrangement of the system of Fig. 1, to wit, the arrangement of the primary and secondary digesters thereof as constructed and connected is essentially that of the arrangements of Figs. 6 to 18 inclusive. The primary and secondary digester arrangement of Figs. 2 to 5 inclusive can be employed in a system similar to that of Fig. 1 by substituting for the primary and secondary digesters 110 and 111 of Fig. 1 the primary and secondary digesters of Fig. 2 and respectively numbered 11 and 27 and by changing the piping according to the functioning and requirements of the arrangement of said Figs. 2 to 5.

The earliest work in connection with the actual carrying out of certain basic aspects of the invention is illustrated in Figs. 2 to 5 inclusive.

Therein 11 represents the primary digester container or tank for anaerobic biological digestion of sewage sludge which is preferably round, having a gas-tight top 12 thereon. The top is apertured at 13 through which the sludge agitating or impelling mechanism or device 10 may be applied, fitted with any suitable removable gas-tight closure 14. Supported from the tank top 12 is a framework 15 from which there depend certain members or elements of the sludge agitating devices and which members or elements are driven by a motor or engine 16 through appropriate gearing 17. The digester tank 11 has a sludge inlet 18 and a sludge outlet 19 but no clarified effluent outlet is necessary since the sludge is agitated or made turbulent to a degree not conducive to, if not actually preventing, concurrent sedimentation. The tank, preferably the top member thereof, is also provided with a gas collecting dome or gas receiving portion 20 and the tank may also be provided with heating coils or pipes 21 for insuring desirable temperature conditions in the digester for anaerobic bacterial activity.

The sludge agitating mechanism 10 which may be operated intermittently or continuously as desired, comprises a rotatable vertical shaft 22 preferably mounted off center in respect to the tank, as shown. The shaft is rotated from the motor 16 through gearing 17, and carries a plurality of impellers or propellers 23, 24 and 25 constituting sludge agitating elements. One of the impellers 23 is mounted on the shaft 22 near to but below the normally maintained minimum liquid level 26 in the tank in a tilted relationship to said shaft, that is, the plane of rotation of the impeller is such that it effects a non-horizontal flow or current movement, to wit, movements which are not at right angles nor in a plane normal to the axis of the vertical shaft 22. The other impellers spaced along the shaft are located in a horizontal position and effect flow or current movements in planes normal to the axis of rotation of the vertical shaft 22. The function of the impellers that are horizontally mounted, is to agitate the particles of the sludge in the tank in horizontal zones, while the top tilted impeller is to discourage if not to prevent the formation of scum in the zone of the liquid level in the digester by razzle-dazzle or circumnutatory flow or current movements which convectively carry scum particles rising to and which would otherwise tend to float and collect at the top of the body of digesting sludge to submergence within the sludge whereby the scum particles ultimately become digested. In this way the collecting and formation of scum is eliminated and avoided.

The effect of this agitation with its consequent hindering of the formation of a floating scum layer and a deposited sludge layer or blanket is to ensure that the entire sludge mass in the primary digester is brought into a relatively homogeneous condition by virtue of which portions of said sludge mass withdrawn from the said digester for further or dewatering treatment have on the average substantially the same proportion of liquid and solid constituents as said sludge mass.

Partially digested sludge from the primary digester 11 is suitably conveyed to a secondary digester or digestion zone or tank 27. This tank 27 is preferably of the sedimentation type since the function of this tank is primarily to thicken the sludge and to obtain a clarified supernatant therefrom and secondarily to finish the biological digestion of the sludge from the primary digester. The tank 27 is therefore sometimes referred to as a sedimentation tank or basin for in it are maintained predominant essentially quiescent conditions as required for sedimentation without concurrent predominating conditions conducive to digestion. Accordingly, digesting sludge from the primary digester is fed to the secondary digester 27 through conduit or pipe 28. If the secondary digester or clarifier is of the Dorr type, which it is preferred that it should be, then it will have the characteristic Dorr sludge rakes. However, this secondary tank will operate with any sludge removal means. This tank 27 is provided with a sludge discharge outlet 29, and an affluent overflow 30. The tank may also be provided with a gas holder or gasometer 31 to catch any gas generated in the tank.

Where a gas holder is used in association with the secondary digester tank 27, then gas from the gas dome 20 of the primary digester tank 11 may be conveyed thereto via pipe line or gas conduit 32 and gas may be removed from the gas holder 31 by any suitable means such as pipe 33. The pipeline of gas conduit 32 thus provides a direct line of communication between gasholder 31 associated with the sedimentation tank and the gas dome 20 of the primary digester tank whereby if the sludge level in the container or tank of either is lowered, a gas pressure can be maintained therein to substantially overcome tendencies of atmosphere to enter thereinto and thus diminish the hazard of an explosive gas mixture being produced in the container or tank in which the sludge level is lowered.

The rotatable shaft 22 of the mixing device should normally be provided with a stuffing box at 34 and have a steady or step bearing at 35. Clean-outs, such as 36, may be provided for the tanks 11 and 27. 37 represents a manhole in digester 11 and there may be provided on this digester, a control housing as shown in dotted lines.

Impellers 23, 24 and 25 when of the well known turbo mixer type have proved to give satisfactory results. This type in the form shown has a disc or body member 39 carrying curved blades or vanes 40 above the disc and other curved blades or vanes 41 below the disc. In the case of the tilted impeller 23, the relative disc and blade construction is the same except that the disc 39, with its blades 40 and 41, is mounted in a tilted position on its hub 42.

In order to assure the agitation in horizontal zones, the arrangement of Fig. 5 may be used wherein horizontal discs 43 and 44 are provided between adjacent impellers such as 24 and 25. These discs may be of the same diameter or of different diameter as shown, particularly the upper one 44 in order to keep the razzle-dazzle action of impeller 23 from interfering with the horizontal agitation set up by the other impellers.

In the early demonstration plant as to which the showing of Figs. 2 to 5 inclusive is illustrative the tank 11 was 29 ft. in diameter and 15 ft. deep. The impellers were of the weedless type and 20 inches in diameter. They were run at a speed of 120 R. P. M. although speeds up to 600 R. P. M. may be used.

In the operating of said demonstration plant there was an intermittent feeding of a quantity of previously sedimented sewage sludge to be digested to the primary digester 11, at or into one elevation such as into the upper interior portion of the digester 11, and a consequent automatic intermittent displacing of digesting sludge at or from another elevation, such as a lower elevation and flow thereof from the primary digester 11 through the sludge discharge piping 28 to and into the secondary digester 27 wherein the anaerobic biological digestion was carried on to completion. The first or primary digester preferably was operated at full capacity so that a minimum of gas collecting space existed between the liquid level and the under side of the gas receiving portion of the digester top.

In the digester 11, the impellers 24 and 25 cause horizontal rotation or agitation of the sludge mass to produce thorough mixing thereof in and throughout the horizontal section or stratum affected thereby. The resulting turbulence causes an evolution of gas, which in rising to the top of the digester, tends to form scum adjacent the liquid level thereof. This tendency to form scum is particularly discouraged if not overcome by the action of the tilted impeller 23 which sets up a razzle-dazzle action or circumnutatory flow current in the digesting sludge as indicated in Fig. 4, and serves to beat back or diffuse the scum particles and any liquor which may rise to the top of the digester into the digesting and horizontally agitated mass of sludge.

This type of impeller produced agitation renders unnecessary the use of a draft tube normally associated with a propeller where mixing effects are desired. It also stimulates and hastens gas production from the digesting sludge. This results in a saving in detention time of the sludge in the primary digester 11 and this in turn means that a smaller, and consequently cheaper, digester can be used than is now customary. Any gas which may ge generated from the secondary digester is caught by the gas collector thereof and this gas collector is particularly adapted to serve as a gas storer for the entire digestion system. The secondary digester can be made large enough without excessive expense to take care of the winter storage of digested sludge. From the secondary digester, the solids of the digested and settled or thickened sludge is discharged for appropriate disposal. The gas evolved from the digesting sludge can be put to the usual uses for power, heat and light.

Rapid agitation in the first stage increases the rate of gas ebullition so that when the sludge enters the second stage, most of the gas has been evolved and the rate of gas production per unit of surface area is greatly decreased. This tends to give a better thickening action in the second stage and also gives a clearer overflow liquor as through the effluent overflow pipe than can be obtained in single stage digestion or in two stage digestion where rapid mixing is not employed in the first stage.

Rapid agitation also gives a relatively uniform distribution of solids content in and throughout the first tank whereby inoculation of digesting sludge, so vital in the proper performance of a digester, cannot be depleted when the sludge from the bottom of the first stage is displaced to the second stage or tank by hydrostatic pressure or otherwise. So the agitation with its resulting mixing and mingling together with consequent overcoming of stratification tendencies in the sludge mass or body is for effecting a substantially homogeneous mixture of the solid and liquid constituents of the sludge mass. Then it is from this mass that fairly representative portions thereof are passed for further treatment in the secondary container.

The horizontal type of agitation or agitation in horizontal zones is an important feature of this invention because it moves the liquor from the sludge without substantially disturbing the solids of the mass beyond a limited horizontal zone, that is, by the use of this type of agitation, a degree thereof can be used which selectively moves the liquor faster than the solids therein. The solids appear to have inertia enough to withstand substantial displacement to other horizontal zones by the agitation whereas the liquid particles do not, so that differential movement of liquor and solids takes place.

This selective and differential motivation of the liquid particles whereby they flow past the solid particles is important since it has been found that when used for biologically seeding or inoculating fresh sludge for initiating or stimulating the digestion process, the liquor can be depended upon for greater seeding action on a dry solids content basis than can digesting sludge.

Heretofore, it was thought necessary to cause the sludge solids to move throughout the digester mass in order to get proper seeding, and in order to produce complete traversal of the mass, the sludge was stimulated by mechanical means to follow vertical paths up and down in the digester. Even without mechanical aid, the ebullition of gas tends toward floating some sludge particles to the top where after release of the gas bubbles therefrom, the solids descend through the sludge mass by gravity. However, in spite of all that has been proposed in the past, short circuiting of solids takes place whereby there are digestible solids discharged from the digester which have avoided the effect thereon of the digestion process. Also in prior digester practice as commercially carried out, sedimentation takes place which results in the sludge solids settling to the bottom of the digester and the liquor rising to the top thereof as supernatant. The sedimented sludge in said bottom, becomes more or less concentrated or thickened and immobile resulting in the dying off of innumerable microorganisms, so that the supernatant is not available to seed biologically the undigested but digestible solids remaining in the digester particularly above the zone of sedimented digested sludge.

These disadvantages are obviated by the use of this invention. Since it is now proposed to make use of the circulation of digester liquor undergoing digestion for seeding instead of the circulation of solids which have become digested or substantially so, it becomes unnecessary to stimulate the circulation of the latter so they can be restricted to a limited zone of movement. This restricted movement of the solids prevents the former trouble of short circuiting. The complete circulation of the liquor while producing limited circulation of the solids is accomplished by the horizontal zones of agitation set up by the impellers, as above described, namely, by causing the liquor to move faster than the heavier solids. The solids tend to remain in the horizontal zone where they find themselves whereas the liquor traverses the entire digester mass, which traversal is aided by the razzle-dazzle and beating back action of the tilted top impeller. Thus by persistent and unrestricted movement of the liquor it is maintained in an optimum condition for both the maximum growth of favorable microorganisms and the maximum seeding capacity thereof because the liquor disperses the microorganisms throughout the digester mass without substantially distributing the solids beyond their horizontal zones.

It will also be noted that sedimentation in the primary digester 11 is endeavored to be prevented because sedimentation and digestion are two antagonistic processes. Sedimentation requires quiescence while for rapid digestion turbulence is required. Consequently by this invention these two processes are kept separate with digestion essentially taking place in the first tank and the sedimentation essentially taking place in the other tank.

More particularly, in the primary digester is caused to prevail optimum conditions of turbulent sludge mixing and mingling for burnable-gas-producing bacterial digestion of the sludge without concurrent quiescent conditions conducive to sedimentation, and sludge having been treated under such conditions is then passed as a mixture that is fairly representative of the digesting sludge mass to a decanting sedimentation container so separated from the digester container that the operative conditions in one container do not influence the operative conditions in the other, in which sedimentation container there is maintained essentially quiescent conditions as required for sedimentation without concurrent turbulent conditions conducive to gasifying bacterial digestion.

In normal operation of the system of Fig. 2 the liquid or sludge level is normally maintained up to minimum by the high section or elevation of the pipe 28. Should the overflow pipe 30 of the secondary digester be as high or even higher than the high section of 28 then said overflow pipe might be considered as determining the minimum level maintained in the primary digester tank. This statement would hold except for such periods as the level in the secondary tank 27 is temporarily lowered incident to the withdrawing of sludge therefrom and in which instance the minimum level within the primary tank 11 would be determined by the high section of the conduit 28. The control of the minimum level of the sludge mass or body in the digester by the high section of the pipe 28 is important because the amount of sludge in the digester to which fresh sludge is intermittently fed is thus assuredly relatively large enough to continue therein a predominance or preponderance of anaerobic bacteria as evidenced by the production of combustible gas.

It will be noted that by the arrangement of this plant, as well as by the arrangements hereinafter specifically described, a construction is provided which readily lends itself to the placing of the primary and secondary tanks whereby the bottoms thereof are at approximately the same general level or elevation thus avoiding any undue excavation for one tank as compared with the other.

Reference will now be made to later or other developments wherein novel yieldable or movable top constructions for the primary digester are disclosed and wherein other novel features and details are also embodied. The arrangements of said later or other developments are commercially practicable in carrying out or realizing the particular invention herein sought to be protected and hence a description of said developments is retained herein. It is to be understood that the essentials of the invention herein sought to be protected and the fundamental functioning features thereof as above described apply with equal force and effect to the construction and operation of the form of apparatus herein described in detail. The detailed description of the apparatus of said later developments in included herein in order that there may exist the benefits incident to that full and comprehensive disclosure which is indicative of different forms and ways in which the invention may be realized or performed.

The construction of the associated digesters of Figs. 6 and 7 will now be described and more particularly in conjunction with reference to Figs. 8 to 14 inclusive. The tank 112 of primary digester 110 is made of concrete. It comprises a floor or bottom portion 116 and peripheral upstanding wall 117 the latter of which carries at the upper interior portion thereof an inwardly extending stop ring or corbel 109 providing a stop for the gas holder or gas holder construction 113 and for supporting the latter in a lowermost position therefor at the upper interior portion of the tank. This stop ring or corbel 109 serves to prevent the loss of gas through the liquid seal around the holder by deflecting rising gas bubbles from the liquid sealing section. The tank 112 is also provided with a vertically extending centrally located guide post 118 which is fixedly secured at 119 relative to the floor of the tank structure.

The gas holder 113 is provided by a vertically yieldable and in fact a vertically movable structure which comprises a sheet metal top 120 and a depending peripheral wall 121, a vertically extending centrally located strut 122 and downwardly inclined connecting members 123 which extend from the peripheral wall 121 inwardly and downwardly to a place where they are connected to the vertically extending strut member 122. This vertically extending strut member 122 is preferably tubular in form and has a vertical sliding engagement with the guide post 118. See in this connection the arrangement in Fig. 14 wherein the post 118 is shown as carrying anti-friction rollers 108 that engage an interior section of the strut or guide tube 122. This strut member 122 has a dual function, it serves in conjunction with guide post 118 to guide the vertical movement of the gas holder 113 and to ensure that the top 120 thereof shall maintain a desired horizontal arrangement for all positions thereof. It also serves to reinforce and support the top 120 when the gas holder is resting in its lowermost position. This provides a construction for preventing the top 120 from buckling, bending or collapsing incident to external air pressure exerted on the gas holder.

The top member or portion 120 of the gas holder is in the form of an umbrella cover or inverted saucer. More specifically and more accurately it may be described as preferably in the form of a top section of a hollow sphere, the periphery of which section is in plan a true circle.

The gas holder however need not be circular in horizontal cross section as any other geometrical form which in horizontal cross section presents a symmetrical arrangement could be employed as for example one showing a hexagonal, octagonal or other symmetrical form. Moreover the top member or top construction of the gas holder need not be in the form of a sphere top, of an inverted saucer, or resembling that of an umbrella top since any suitable geometrical form could be employed, be it that of a cone, of a pyramid, a frustrum of a cone or a frustrum of a pyramid. An essential factor is that the top member or top construction of the gas holder shall be hollow so as to have a concave portion at the under side and which is well constructed to withstand either internal or external pressures as and when applied thereto.

The peripheral wall 121 of the top holder depends downwardly from said concave top section or inverted saucer shaped top member. This peripheral wall may be defined as a peripheral ring or member which has a gas-tight connection or union with the top member whereby a gas-tight top construction for the holder is provided. This peripheral ring or wall 121 is of metal and is loaded with concrete ballast 107. This concrete ballast is relatively heavy and the function thereof is to place a relatively progressive and increasing load on the gas holder particularly as the gas holder rises sufficiently to lift the concrete ballast so that it projects above the sealing liquid and whereby a progressively and substantially increasing load is imposed upon the movable holder according to the amount of ballast projected above the liquid level. In the lowermost position of the gas holder the lower edge portion of the peripheral wall or ring 121 rests upon the stop ring or corbel 109. An inspection of the drawings will make it clear that this stop ring is positioned so that the gas holder even in its lowermost position is located adjacent to the upper portion of the primary digester and also that the vertical movement of the gas holder during any normal operation thereof is small or relatively limited particularly as compared with the vertical movement of the gas holder for the secondary digester as will presently appear. As previously indicated, according to and within the broader aspects of the invention, it is feasible to construct the primary digester so that the gas holder thereof can have a long range of movement and so that the gas holding capacity thereof can be relatively large.

The strut member 122 heretofore described as a tubular member is provided with openings 106 at the top end thereof whereby any pocketing of gas that might otherwise affect the movement of the gas holder is avoided.

Mixing devices or sludge impelling mechanisms 124 frequently referred to as turbo mixers are carried by the gas holder so as to be vertically movable therewith. The arrangement of these mixing devices is clearly shown in Figs. 6 and 7 and the general construction thereof and mode of mounting the same is clearly shown in Figs. 13 to 16 inclusive. The mixing device (or devices) 124 is similar in essential operative characteristics to the mixing device or sludge impelling mechanism 10 previously described in connection with the system of Figs. 2 to 5 inclusive. Each of these mixing devices 124 comprises a base 125 which is detachably secured to the top 120 as through the medium of bolts 126 and in a manner whereby a gas-tight joint is provided as between the top 120 and the base 125. Upon this base 125 there is carried the housing 127 of an electric motor 128 the rotor of which is connected so as to drive through the medium of suitable gearing and coupling 129, a vertically extending shaft 130 of the mixing device so as to effect the normal rotary movement of the latter. Suitable gas-tight packing 131 is provided below said coupling 129. In the immediate region of each mixing device a depending ring 132, which is circumferentially arranged with respect to the shaft 130, depends from the cover a sufficient distance to extend into the liquid or digesting sludge maintained up to a minimum level within the primary digester when the latter is functioning. The purpose of this depending ring 132 and liquid seal resulting from the use thereof is to provide an arrangement whereby, at will, the mixing device as a whole can be removed from place without allowing the escape of gas from the holder by merely removing nuts from the bolts 126.

Each mixing device is provided with non-clogging impellers as 133 in vertically spaced arrangement. Each of these impellers comprises a hub section 134, a body section 135 arranged in an inclined position in respect to the hub axis whereby when the impellers are in place the bodies are tilted at a slight angle from the horizontal and each impeller also includes vanes or blades 136 for producing impeller effects in directions away from the axis. The inclination of the body as it rotates produces vertical components of flow movements while the vanes or blades produce horizontal components of flow movements and the functioning of these impellers produces what may be referred to as the razzle dazzle or circumnutatory motion or mixing action within the liquid body affected thereby. The functioning of these impellers, which are also offset or eccentrically located in respect to the general axis of the tank as is manifest from Figs. 6 and 7, produces what may be generally termed epicyclic type of currents or movements throughout the various sections of the liquid body.

Some or all these impellers are frequently made and employed so that the body section thereof need not be inclined to the hub axis with the result that the body section and the impellers move in true horizontal paths thus avoiding most or much of the vertical components which are experienced where the body is inclined to its axis. Impellers with bodies at right angles to their axes are useful in the lowermost layers of the sewage sludge but it will be pointed out that the impellers with the bodies inclined to their axes of rotation are particularly useful in the upper layers of the sludge since the operation thereof assists in breaking down scum and in the thoroughly mixing of the tank contents in such a manner that the accumulation of scum at the upper interior portion of the primary digester is avoided due to scum particles being swept by the razzle-dazzle currents back to submergence within the body of digesting sludge.

The mixing devices as illustrated herein have been described in considerable detail and as previously indicated function as non-clogging impellers or in other words are of the non-clogging type. It is feasible to construct each impeller so that it primarily comprises or consists of a body or hub portion and blade members, which body or hub portion is secured to the vertical extending propelling shaft to which the impeller corresponds and which blade members extend outwardly from said body or hub portion. Such blade members may be considered as compositely defined by the upper and lower blade elements heretofore described. The blade elements function to effect a forced or circulatory movement of liquid away from the shaft particularly since there is no peripheral restraint against outward flow because there is not any ring or other restraining member located at or in the immediate vicinity of the periphery of the impeller.

As to the impellers herein shown some have body members in effect provided by plates that extend at right angles to the axis while some have body members in effect provided by plates that are inclined to the axis about which they are rotated. It is feasible however to construct impellers that will function along the same lines as the impellers herein illustrated and this even though the plate portions just referred to are not necessarily employed. By bearing in mind the particular work to be done by a particular impeller it is merely a matter of design to construct the impeller to do the work desired therefore.

The lower ends of the mixer shafts 130 are provided with removable steady bearings each of which includes a bearing member 137 that is retained upon the shaft 130 and which is removable therewith because of spaced collars 138—138 which are secured to the shaft. In this connection see Figs. 13, 14, and 15. Each bearing member 137 has an outer section 105 in the shape of a frustrum of a cone whereby it readily sets or positions itself in place on the conical seat section 139 which is carried at the outer end of the corresponding extension arm construction 140 that includes parallel channels 141 and 142. The intermediate sections of these channels are secured in any suitable manner as by welding at 143 to the vertically extending strut member 122. Braces 144 are relied upon for firmly supporting the outer ends of the arm construction 140 against downward deflection. It will be noted that the outside diameter of each impeller 133 and of the removable steady bearing member 137 is less than the inner diameter of the depending ring 132 with the result that the mixing device 124 as a whole can be readily removed and replaced at will solely by the operator removing nuts from the bolts 126 and vertically moving the mixing device from or towards its normal position in respect to the gas holder top.

The primary digester receives the sewage sludge to be digested in any suitable manner as through the feed pipe 145 which it will be noted according to the arrangement shown delivers the incoming or influent sewage sludge into the upper interior portion of the primary digester tank, preferably through a section of the feed pipe 145 which is located somewhat below and which extends past the supporting surface at the top of the stop ring or corbel 109.

Sewage sludge, which has been treated, passes from the primary digester through a discharge section 146 into a discharge pipe or conduit 147 having a valved branch 148 and an upwardly extending branch 149 the latter of which terminates in an adjustable overflow or weir construction 150 that is relied upon for ensuring that the minimum level of the body of sewage sludge retained in the primary digester shall always be at least up to the height determined by the overflow. For the details of the overflow arrangement of both the primary and secondary digesters see particularly Figs. 8 to 11 inclusive.

In the normal functioning of the primary digester the valved branch 148 is closed whereby all of the sludge passing from the primary digester must pass through the overflow branch 149. It will also be here noted that as sludge is supplied to the primary digester for treatment therein a corresponding amount of sludge which has undergone digestive treatment in the primary digester passes therefrom through the overflow branch 149 on its way to a secondary digester as will hereinafter more clearly appear.

The primary digester also has a gas offtake piping or conduit 154 the upper intake end 152 of which extends into the gas receiving space which is always maintained within the upper interior portion of the primary digester, to wit, into the gas receiving space at the under side of the gas top 120 on the one hand and the top of the body of sewage sludge maintained within the primary digester on the other hand. This gas piping 151 extends into the secondary digester and terminates in a pipe section 153 the upper end of which extends into a gas space provided in the upper portions of the secondary digester with the result that during the normal functioning of the digesters the gas spaces of both digesters are in constant communication.

The primary digester is also preferably provided with a normally closed depending pipe 154 (see Fig. 6) that always dips into the sludge within the primary digester but which is arranged to provide a sampling opening by which ready access for sampling purposes is realized.

The primary digester is provided with heating coils 155 which are useful in ensuring sufficient heat to the sewage sludge to facilitate the digestion that is carried out therein. The gas holder is secured against horizontal rotation relative to the tank through the medium of chains 156 and 157 which are referred to as tangential guides.

The secondary digester 111 is shown larger than the primary digester and comprises a secondary digester or sedimentation tank 114 provided with a downwardly and inwardly inclined bottom 116 and upstanding peripheral wall 117 carrying spaced stops 161. The secondary digester has a vertically yieldable or vertically movable gas holder 115 that comprises the umbrella shaped top sections 163 from which there depends the peripheral wall 164 preferably carrying at the lowermost edge thereof a ring of concrete ballasting material 165. The peripheral wall 164 of the gas holder when the latter is in lowermost position rests upon the stops 161. The general construction of the gas holder of both digesters is substantially the same in that each comprises a centrally located vertically extending strut as 122 for the primary digester or 166 for the secondary digester and inwardly and downwardly extending tie rods or connecting members as 123 for the primary digester or 167 for the secondary digester which rods or members serve to support the lower end of the centrally located strut corresponding thereto. The lower edge portions of the peripheral ring 164 are supported against inward collapse by radial strut members 162 the inner ends of which rest upon and are secured to the strut 166. The strut 166 in the secondary digester is also a tubular member having vent holes 158. The guide member or tube 166 slides along a fixed vertically extending guide post 168 which is positionably secured in place in respect to the masonry providing the floor of the secondary digester tank. By this construction the secondary gas holder is guided throughout the entire range of its normal vertical movement and the strut construction also serves to interiorly support the plate top section of the digester against internal buckling or collapsing should there be realized a decrease in pressure within the tank and an excessive unbalanced pressure on the outside of the tank.

Reference has heretofore been made to the valved branch 148 of the primary digester. This branch is connected to a T or cross pipe fitting 169 leading for example to a sludge pump as along path 100 or to a place for other mode of sewage solids disposal as along the path SB to a sludge bed.

The tank of the secondary digester has a solids discharge section 170 leading to a valved sludge pipe or conduit 171 which terminates in a T pipe fitting 169. It will therefore be apparent that the piping which includes the pipe 147, cross fitting 169 and pipe 171 when the valves are open can be employed for the direct passage of sewage sludge from the primary digester to the secondary digester. Normally the valves are closed so this direct transfer cannot take place. Upon the opening of either the valved pipe 147 or the valved pipe 171 it will be manifest that sludge can be pumped at will from the primary digester or secondary digester to and through the cross fitting 169, thence along the path 100 by a pump as 7 or 8. See Figs. 9, 7, 6 and 1. It would also be possible to effect a reverse pumping action to unplug the valved pipes 147 or 171 should occasion require. The secondary digester normally functions over an extended period without the withdrawing of sludge and then at the proper time the deposited solids remaining after the digestion and sedimentation carried out therein are removed through the pipe 171. This removal of sludge solids of course effects a lowering of the normal water level within the secondary digester and this is accompanied by a lowering of the gas holder. In order to avoid lowering of the liquid within the secondary digester in such a manner as to unduly reduce the gas pressure therein whereby too great a differential as between the exterior air pressure and the internal pressure will take place—so great a differential as will tend to cause the gas holder to collapse or fail—there are provided certain ordinary check arrangements, to wit, as follows: a sludge check or ball valve 172 that is carried by chains 173 is provided and which sets itself in the solids discharge section 170 slightly before or at least by the time that the secondary gas holder reaches its lowermost position; also a gas check comprising a valve or pipe closing member 174 supported at the upper end of rod 175 arranged to effect a closing of the upper end of the gas pipe or conduit 153 at or by the time the secondary gas holder reaches its lowermost position with the result that communication between the digesters is shut off and also with the result that further withdrawal of gas from the secondary digester cannot take place. A sealing ring 160 depends from the top member 163 of the gas holder for the secondary digester. See Fig. 8. This sealing ring dips into the sludge liquid within the secondary digester when the gas holder is in its lowermost position and provided the liquid is up to the minimum height as determined by the overflow weir construction for the secondary digester. Under such conditions access to the valve 174 is afforded without allowing the escape of gas from within the secondary gas holder. Likewise a similar sealing ring 159 is provided at the under side of the top portion of the gas holder for the primary digester. The sealing ring 159 dips into the sewage sludge when the gas holder is in its lowermost positon. Under the conditions specified—with the gas holders in their lowest position—the flow of gas therefrom into the gas pipe 151 is prevented.

It has heretofore been pointed out how the sewage which has undergone treatment in the primary digester passes therefrom by the overflow 150 as sewage sludge to be treated is supplied to the primary digester through the feed pipe 145.

Figure 10:
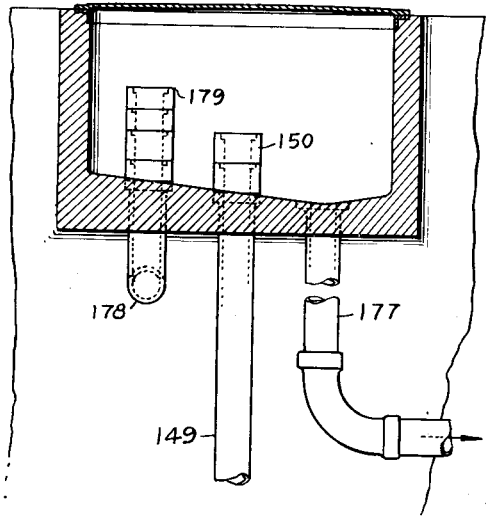
Fig. 10 is a vertical sectional view taken as on the plane indicated by the line 10—10 of Fig. 8 looking in the direction of the arrows, this Fig. 10 being a vertical sectional view showing the overflow arrangement for the primary digester in respect to the inlet end of a pipe or conduit leading to the secondary digester.
Figure 11:
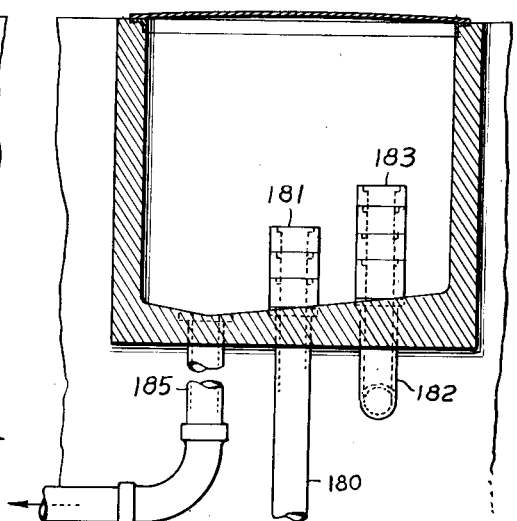
Fig. 11 is a vertical sectional view taken as on the plane indicated by the line 11—11 of Fig. 8 looking in the direction of the arrows, this Fig. 11 being a vertical sectional view showing certain overflow arrangements for the secondary digester in respect to the inlet end of a pipe or conduit for conducting the relatively clear effluent liquid to a place for the disposition of the same.

An inspection of Figs. 9 to 11 inclusive will make it clear that the digesting sewage sludge which passes the overflow 150 enters the receptacle or trough 176 and flows therefrom through a pipe 177 that delivers the sewage to the secondary digester and more particularly into the lower section of the liquid body maintained within the secondary digester.

These figures also show a second overflow pipe or conduit 178 leading from the primary digester and terminating in the adjustable overflow section 179 that is somewhat higher than the overflow 150. This second overflow 178 and 179 is provided in case the overflow branch 149 which terminates in overflow 150 becomes plugged or unduly loaded, thereby avoiding any undue excess of liquid level within the primary digester during the normal operation thereof.

The secondary digester has an overflow construction relatively remote from the place where sewage sludge is introduced into this secondary digester as will be seen from an inspection of Figs. 6 to 13 incl. The overflow arrangement for the secondary digester comprises an offtake or outflow pipe or conduit 180 leading from below but near the upper normal water level for the body of liquid within the secondary digester as is determined by the overflow arrangement for this digester. This pipe or conduit 180 leads through the wall of the digester and terminates in an adjustable overflow or weir section 181 for determining the maximum normal water level within the digester. In case this pipe construction 180 or 181 should become plugged or ineffective there is provided an auxiliary overflow or outflow pipe 182 that terminates in an adjustable overflow or weir 183 the latter of which is somewhat higher than the overflow 181. For convenience and comparison the overflow arrangements of the primary and secondary digesters have been brought into close relationship in Figs. 8 and 9. Overflows 181 and 183 of the secondary digester deliver into a tank or receptacle 184 from the bottom of which there extends a pipe or conduit 185 for conducting the relatively clear delivered effluent to such place of use or disposal as is deemed desirable. The normally functioning overflow 150 for the primary digester occupies a higher elevation than the normal overflow 181 or even the overflow 183 for the secondary digester and it will be apparent that when the liquid level within the secondary digester is up to the normal maximum level as determined by overflow 181 that a feed of sewage into the primary digester simultaneously effects a flow of a corresponding amount of treated sewage from the primary digester into the secondary digester and a corresponding flow of relatively clear effluent from the secondary digester past the overflow 181 thereof. The secondary digester is preferably provided with sampling pipes 186, 187, etc., whereby samples from the various levels within the secondary digester can be readily attained. The secondary digester has any suitable sway bracing and guides such as are provided for example by sway chains 188 and 189 and by the vertical guideways indicated at 190.

In certain localities where freezing may take place arrangement is made for employing a removable seal heating coil pipe as at 191 for the primary digester and as at 192 for the secondary digester whereby the sealing liquid or sludge around the gas holders will not become frozen and thus prevent a moving or yielding of the holders. Each gas holder is also preferably provided with a normally closed manhole such as indicated at 193 for the primary digester or at 194 for the secondary digester.

The combination of primary and secondary digester as just described in detail particularly as shown in section in Fig. 6 typifies the construction of the primary and secondary digesters employed in the system of Fig. 1. A somewhat better or more comprehensive understanding however is obtainable upon a further consideration of the arrangement and operation of the parts as outlined in Fig. 1 and therefore a more detailed statement in respect to said figure is now set forth.

The reference character "V" which appears in several places on the drawings indicates a valve which can be opened or closed to permit a flow therethrough or to shut off a flow past the same according to the desires of the operator.

Water supply pipes are indicated on the system by W and are provided whereby water is available if desired for any particular purpose.

WL indicates the normal minimum liquid level within a particular digester as determined by the overflow or weir construction associated therewith.

As previously stated the sewage supply to be treated passes from SS along a path 1 or 3 as the case may be to a clarifier or thickener 2 or 4 wherein the sewage sludge is settled out and from which the sewage sludge thus settled out is withdrawn for passage to the primary digester 110. It is well within the contemplation of the present scheme that chemical treatment or even aeration of either the raw sewage prior to sedimentation in the clarifier 2 or 4 or of the sewage sludge therefrom can be carried out.

The effluent from the clarifier is passed therefrom as along the path 2A or 4A for such disposition as may be desired for a particular plant. Any scum collecting at the top of the clarifier may be passed therefrom as along the path 2B or 4B to a point where it will join the sludge from the clarifier.

Sludge pumps 7 and 8 are connected in the piping system that includes the pipe lines 5 and 6 whereby at will either one of the pumps can be operated to function in the pumping of sludge from either of the clarifiers or whereby if desired one pump can be pumping from one clarifier while the other is pumping from the other clarifier or whereby one of the pumps may be pumping from one clarifier while the other of the pumps may be pumping sludge solids from the secondary digester as will hereinafter more fully appear.

Either or both of the pumps 7 and 8 can be relied upon as desire to pass sewage sludge into the primary digester through the feed pipe section 145 thereof or at will either or both of the pumps can deliver liquid pumped thereby along the path 9B for such use or disposition as desired or as along the path 9A as for example to a sludge receiving bed along the path marked SB.

From Fig. 1 it will be seen that the suction side of either or both of the pumps 7 and 8 can at will be connected through the medium of pipe line 100 in a manner to draw or pump sludge solids from the secondary digester 111 or even to pump sludge from the primary digester 110.

In the normal functioning of the system this line 100 is closed and the normal functioning of the pump or pumps then is to deliver raw sewage sludge into the primary digester thereby forcing or else causing a feeding of sludge which has undergone digestion from the primary digester into the secondary digester and, providing the liquid level in the secondary digester is up to the minimum level to be maintained therein, there follows a flow from the secondary digester of relatively clear effluent which can be passed along the path 185 and branch 102 to one place for disposition or as along the branch 103 back into the raw sewage supply. If however it is desired to withdraw sludge from the bottom of the secondary digester either of the pumps can be employed for this purpose by opening the proper valve and the withdrawn sludge can be passed from the system as along the path 9B or 9A as desired and this can take place even though the other pump is functioning to supply raw sewage to the primary digester tank.

The arrangement whereby sewage sludge can be pumped from either of the digesters 110 or 111 through the pipe line 100 is clearly shown in Figs. 6, 7, and 9 and comprises the pipe 147 and valved control pipe 148 leading to the cross member 169 and the valved control pipe 171 also leading to the cross member 169. The gas piping or conduit which includes the parts 152, 151, and 153 previously referred to (and in this connection see Figs. 1, 6, 7, and 9) places the gas receiving portions of the primary and secondary digesters in communication and it includes a condensate trap CT whereby accumulating water may be eliminated from the gas line. The gas will be employed for heating by passing the same along the path 104 through condensate trap CT past meter M to the furnace of a hot water boiler 205 or directly to burners for lighting or other use as along the path 206. A pressure relief trap may be provided at 207. The hot water boiler includes a heating coil HC which is in a circulatory system that includes the heating coils 155 of the primary digester and which may also include the removable heating coils 191 and 192 provided for preventing any freezing of the seals in the primary and secondary digesters. The circulation may be maintained as by means of the circulating pump 208.

In Fig. 17 there is shown an arrangement of primary digester and secondary digester each having a tank and associated vertically movable gas holder or top constructed so that the top for the primary digester has a relatively limited movement while the top for the secondary digester has a relatively long vertical movement whereby the latter can function as a gas storer as well as a gas collector. The functioning of the arrangement of this Fig. 17 follows very closely the functioning of the arrangement shown in Figs. 6 and 7 and therefore any extended description in reference to Fig. 17 is not necessary. The gas holder however of Fig. 17 is designated as 210 and it will be seen that there is associated with the sheet metal top or roof portion 213 thereof a buoyant peripheral ring provided by the hollow gas-tight annular section or pontoon 214 which is defined by the outer portion 215 of the top 213, the lowermost annular portion 216, an upright outer ring 217 and an inner ring 218. In Fig. 17 the gas holder 210 is shown resting on the stop ring or corbel 109 but in the normal functioning of the digester this cover occupies a slightly elevated position approximately that indicated by the dotted lines. It will be readily appreciated that this cover can have a slight vertical movement incidental to any fluctuations of liquid level within the tank, also in response to vibrations in gas pressure conditions, but that the pontoon construction provided by the hollow annular section 214 described is sufficiently heavy to effect a material loading of the top whereby any extended lifting movement of the top relative to the liquid and incident to fluctuations in gas pressures during normal operation is avoided.

In Fig. 18 there is shown a primary digester and secondary digester similar in many respects to the arrangements shown and described in conjunction with Figs. 6 and 7. According to the construction of Fig. 18 however the gas holder of the primary digester is vertically yieldable but it is loaded so as to remain during the normal operation of the digester in the lowermost position therefor, to wit, at rest upon the stop ring or corbel 109. In this figure the gas holder as a whole is designated as 310. It comprises the umbrella shaped sheet metal top member or roof portion 313 and has a peripheral ring 317, part of which ring depends from and part of which ring extends above the peripheral edge of the umbrella shaped portion 313. At the exterior top peripheral portion of this gas holder or top member 310, to wit as at 318, there is placed suitable weighting material as concrete which ensures weight somewhat in excess of that required for normally holding the cover in lowermost position on the stops and which functions in opposition to any buoyant effect of the sludge liquid within the tank 117 and against the normal gas pressures experienced within the digester. Otherwise than as indicated the arrangement of this Fig. 18 operates substantially along the lines described in connection with the arrangement of Figs. 6 and 7.

This case is a continuation in part of our patent application Ser. No. 680,450 filed July 14, 1933, in which application Figs. 2 to 5 hereof appeared with a description thereof and their subject-matter claimed. Said application has been dropped (but not the invention thereof) after the filing of the application from which this present patent matured, but for the common subject-matter we claim July 14, 1933 as our effective filing date. Applications for patent on inventions divisible from this case have been filed.

What is claimed is:

1. In the treating of sewage and the like polluted waste waters, the method which comprises taking fresh sludge derived from sedimentation of the sewage and made up of liquid and solid constituents, intermittently feeding a quantity of sludge as thus derived to a mass or body of similar sludge in the primary digestion zone wherein said sludge undergoes the major portion of anaerobic bacteriological digestion; maintaining in said zone an amount of sludge which in relation to the quantity of the fresh sludge supplied thereto is sufficiently large to assure the continuing predominance of anaerobic bacteria in the sludge mass as evidenced by the production of combustible gas; mechanically agitating the sludge in said primary digesting zone to effect a mixing and mingling of the constituents thereof sufficiently vigorously for discouraging the formation of a floating scum layer and for hindering the formation of a layer of settled sludge solids by virtue of which there is realized a substantially homogeneous mixing of the entire sludge mass; intermittently withdrawing from said primary digesting zone a portion of the thus homogeneously mixed sludge wherein in such withdrawn portions there is on the average essentially the same proportion of the sludge constituents as exists in and throughout the entire sludge mass as the result of said mixing and mingling; delivering said withdrawn sludge to a dewatering zone into which all of the liquid and solid sludge contents leaving the primary digesting zone are ultimately received and exposed to dewatering treatment; said major portion of the bacteriological digestion as carried out in said primary digesting zone and said dewatering treatment as carried out in said dewatering zone being separated and out of the range of disturbing influence of one on the other, separately removing the clarified effluent and the thickened sludge resulting from said dewatering treatment, and collecting combustible gas evolved from the sewage sludge as the result of the bacteriological digestion.

2. The performing of a method as defined in and by claim 1 and according to which the sludge withdrawn from the primary digesting zone is passed to a sedimentation zone wherein the anaerobic digestion tapers off and wherein the dewatering operation is effected by sedimentation under conditions by which supernatant liquid leaves as an effluent from the upper portion of the sedimentation zone and settled thickened sludge is withdrawn from the lower portion of the sedimentation zone; and effecting a collecting of combustible gas evolved as the result of bacteriological digestion in both the digestion zone and the sedimentation zone.

3. In the performing of a method as defined in and by claim 1, the carrying out of the dewatering operation by sedimentation under conditions according to which the supernatant liquid leaves as an effluent along one path and according to which settled thickened sludge is withdrawn along another path.

4. In the performing of a method as defined in and by claim 1, according to which method the sludge in passing from the primary digesting zone to the dewatering zone must flow through and over an elevation that determines the minimum height of the sewage sludge undergoing digestion in the primary digesting zone and thereby the minimum amount of digesting sludge which is maintained in the primary digesting zone.

5. In a system for treating fresh sludge derived from sedimentation of sewage and the like polluted waste waters made up of liquid and solid constituents, in combination a digester container providing a primary digesting zone wherein there is maintained a mass or body of such sludge while undergoing the major portion of anaerobic bacteriological digestion, sludge feeding means for intermittently feeding a quantity of such fresh sludge to said digester container and thus into the body of sludge undergoing digestion in the primary digesting zone, said primary digesting zone being sufficiently large in respect to the sludge feeding means as normally operated whereby the body of digesting sludge maintained in said primary digesting zone is sufficiently large to assure the continuing predominance of anaerobic bacteria in the sludge mass as evidenced by the production of combustible gas, mechanism for mechanically agitating the sludge in said primary digesting zone to effect a mixing and mingling of the constituents thereof sufficiently vigorously for discouraging the formation of a floating scum layer and for hindering the formation of a layer of settled sludge solids by virtue of which there is realized a substantially homogeneous mixture of the entire sludge mass, sludge withdrawing conduit leading from the primary digesting zone of the digester container for intermittently withdrawing from said primary digesting zone a portion of the thus homogeneously mixed sludge wherein in such withdrawn portions there is on the average essentially the same proportion of the sludge constituents as exists in and throughout the entire sludge body as the result of said mixing and mingling, sludge dewatering devices providing a dewatering zone, said sludge withdrawing conduit having a portion thereof leading to said dewatering devices whereby there is ultimately delivered into said dewatering zone and exposed to dewatering treatment in the latter all of the liquid and solid content of the sludge leaving the primary digesting zone, said digester container and said dewatering devices being so constructed and arranged in respect to each other that the major portion of the bacteriological digestion as carried out in said primary digesting zone and said dewatering treatment as carried out in said dewatering zone are separated and out of the range of disturbing influence of one on the other, said dewatering devices having members for separately removing the supernatant effluent and the thickened sludge resulting from said dewatering treatment, and means for collecting combustible gas evolved from the sewage sludge as the result of the bacteriological digestion.

6. In the anaerobic digestion of sewage sludge the method which comprises feeding at one elevation of sewage sludge to be digested into a body of sewage sludge undergoing the anaerobic digestion and withdrawing for the purpose of further treatment sludge from another elevation from the body of digesting sludge in such a manner that the vertical current movement incident to such feeding and withdrawing is relatively slow, which method is characterized in that all portions of the body of the sludge are subjected to agitation carried out in such a manner as to hinder substantial settling or depositing of solids at the bottom of the digesting space and more particularly in a manner such that the sludge in the intermediate and lower horizontal sections of said body of sludge undergoing digestion are subjected to relatively fast flow or current movements along substantially horizontal paths and throughout each said horizontal section or stratum of the sludge body but so that the uppermost horizontal section or stratum is subjected to relatively fast continuing and repeating rotary flow movements the planes of which oscillate vertically and which are effective throughout the entire upper horizontal section or stratum whereby scum particles which might otherwise tend to collect and remain at the top of the body of sludge are placed in motion and are convectively carried back to submergence within the body of digesting sludge.

7. In the anaerobic digestion of sewage sludge in a confining tank or basin wherein a body of sewage sludge undergoing such digestion is maintained up to a relatively constant minimum level the method which comprises feeding sewage sludge to be digested into the upper portion of the body of sewage sludge undergoing such anaerobic digestion, subjecting the upper portion of the digesting sewage sludge throughout the entire uppermost horizontal section or stratum thereof to flow or current movements to cause scum particles which may present themselves or exist in the upper section or stratum to be convectively carried back to within the body of digesting sludge whereby a complete digesting of the scum particles will be effected and the accumulating of scum at the top of the body of sewage sludge will be avoided, subjecting the intermediate and lower horizontal sections or strata of the body of sewage sludge undergoing digesting to flow or current movements in paths sufficiently horizontal to hold substantially all solids in suspension and against sedimentation, and withdrawing sludge from the lower portion of said body of digesting sewage sludge; the downward flow incident to the feeding of incoming sewage sludge into the upper portion of the body and the withdrawing of the sludge from the lower portion of the body of digesting sewage sludge being relatively slow as compared with the flow or current movement created at and for the upper, intermediate and lower horizontal sections or strata of the body of digesting sewage sludge.

8. The process of producing and separating digested sludge from sewage and the like which comprises feeding sewage sludge to a sludge digestion and gas recovery container, exposing said sludge in said container to optimum conditions of turbulent sludge mixing and mingling for burnable gas-producing bacterial digestion of the sludge without concurrent quiescent conditions conducive to sedimentation; detaining said sludge in said container until most of the evolvable gas has been evolved; passing according to operative requirements the mixed and mingled sludge from the digestion container to and into a decanting sedimentation container so separated from the digester container that the operative conditions in one container do not influence the operative conditions in the other, maintaining in said sedimentation container essentially quiescent conditions as required for sedimentation without concurrent turbulent conditions conducive to gasifying bacterial digestion; collecting gas derived from the sludge in each of said containers; storing said so-collected gas in a gas-storing space associated with said containers; decanting supernatant liquid from said sedimentation container; and ultimately removing digested and thickened sludge from said sedimentation container.

9. The process of producing the digestion and dewatering of sewage sludge and the like with the concurrent recovery of gas evolved by the digestion processes which comprises exposing the sludge to be treated in a closed primary digestion container to bacteriological digestion activity to evolve burnable gas from the treated sludge; positively and turbulently agitating the sludge being digested in order to ensure the realizing of an essentially homogeneous mixture of bacteriologically active sludge in said container and in order to discourage the formation of scum at the top thereof and also in order to hinder any substantial settling of solids on the bottom thereof; removing a quantity of said mixture to a secondary container wherein sedimentary thickening of said removed sludge mixture is realized away from direct influence thereupon of the positive agitation carried out within the primary container, which said removing is accomplished by automatically, according to the amount of incoming sludge, displacing a corresponding amount of the digester-treated sludge from the primary container to the secondary container; by virtue of which positive mixing agitation and automatic displacement there is avoided harmful depletion from the sludge in the digestion container of the preponderance of active anaerobic bacterial inoculating material requisite for continuous operation of the gas-productive bacteriological digestion maintained in the primary container.

10. The process of digesting sludge derived from sewage and the like polluted waste waters which comprises exposing the sludge to be treated in a gas-collecting digestion tank in which are caused to prevail and continue conditions optimum for anaerobic bacterial activity setting up in the sludge mass in the digestion tank a plurality of substantially horizontal zones of mechanically induced rotational agitation, the lowermost zone thereof having agitation of sufficient revolving intensity to substantially hinder if not prevent the formation of a layer or blanket of settled sludge on the bottom of the digestion tank, and the uppermost zone thereof having agitation of sufficient swirling intensity and of sufficient angularity from the true horizontal to effectively depress and disseminate into the digesting sludge mass those normally floated solids which would otherwise form a scum layer floating on said digesting mass; and then exposing quantities of said digester-treated sludge to sedimentation under a condition of relative quiescene.

ANTHONY J. FISCHER.
NELS B. LUND.